United States Patent
Pawlowski

(10) Patent No.: US 6,493,799 B2
(45) Date of Patent: *Dec. 10, 2002

(54) WORD SELECTION LOGIC TO IMPLEMENT AN 80 OR 96-BIT CACHE SRAM

(75) Inventor: Joseph Thomas Pawlowski, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/841,643

(22) Filed: Apr. 24, 2001

(65) Prior Publication Data

US 2001/0023475 A1 Sep. 20, 2001

Related U.S. Application Data

(63) Continuation of application No. 09/299,799, filed on Apr. 26, 1999, now Pat. No. 6,223,253, which is a continuation of application No. 08/663,386, filed on Jun. 13, 1996, now Pat. No. 5,960,453.

(51) Int. Cl.[7] ............................................. G06F 13/16
(52) U.S. Cl. ....................................... 711/118; 710/127
(58) Field of Search .......................... 711/118; 710/127, 710/34, 35

(56) References Cited

U.S. PATENT DOCUMENTS

| | | | |
|---|---|---|---|
| 3,848,234 A | 11/1974 | MacDonald | 711/119 |
| 4,084,234 A | 4/1978 | Calle et al. | 711/118 |
| 4,386,402 A | 5/1983 | Toy | 711/3 |
| 4,885,680 A | 12/1989 | Anthony et al. | 711/144 |
| 4,953,073 A | 8/1990 | Moussouris et al. | 711/3 |
| 5,015,883 A | 5/1991 | Waller | 326/50 |
| 5,053,951 A | 10/1991 | Nusinov et al. | 711/206 |
| 5,091,846 A | 2/1992 | Sachs et al. | 711/130 |
| 5,091,850 A | 2/1992 | Culley | 711/3 |
| 5,155,824 A | 10/1992 | Edenfield et al. | 711/143 |
| 5,164,944 A | 11/1992 | Benton et al. | 714/765 |
| 5,184,320 A | 2/1993 | Dye | 365/49 |
| 5,220,215 A | 6/1993 | Douglas et al. | 326/39 |
| 5,228,134 A | 7/1993 | MacWilliams et al. | 711/138 |
| 5,235,221 A | 8/1993 | Douglas et al. | 326/38 |
| 5,280,598 A | 1/1994 | Osaki et al. | 710/127 |
| 5,287,017 A | 2/1994 | Narasimhan et al. | 326/37 |
| 5,293,603 A | 3/1994 | MacWilliams et al. | 710/129 |

(List continued on next page.)

FOREIGN PATENT DOCUMENTS

| | | |
|---|---|---|
| JP | 54-109336 | 8/1979 |
| JP | 62-184551 | 8/1987 |
| JP | 4-84253 | 3/1992 |
| WO | 97/48048 | 12/1997 |

OTHER PUBLICATIONS

"Fast TTL Burst controller for Microprocessor", *IBM Technical disclosure Bulletin*, vol. 33, No. 8, pp. 118–120, (Jan. 1991).

"Pentium Processor User's Manual", *vol. 2, 82496 Cache Controller and 82491 Cache SRAM Data book*, 1–13–1–20, 4–1, 4–5–, (1994).

"Pentium Processor User's Manual, vol. 1, Pentium Processor Data Book, Intel Corporation", *vol. 1, Pentium Processor Data Book*, Intel Corporation, 6–13 to 6–17, (1994).

*Primary Examiner*—Reginald G. Bragdon
(74) *Attorney, Agent, or Firm*—Schwegman, Lundberg, Woessner & Kluth, P.A.

(57) ABSTRACT

A logic which enables implementation of a 80-bit wide or a 96-bit wide cache SRAM using the same memory array. The logic implementation is accomplished by merging tag, and data into an order block of information to maximize bus utilization. The logic reduces the bus cycles from four cycles for an 80-bit to three cycles for a 96-bit implementation.

43 Claims, 11 Drawing Sheets

| INITIAL ADDRESS 01 | OB6 | OB5 | OB4 | OB3 | OB2 | OB1 |
|---|---|---|---|---|---|---|
| CYCLE1 | 2.4 | 2.3 | 2.2 | 2.1 | TAG.2 | TAG.1 |
| CYCLE2 | 3.4 | 3.3 | 3.2 | 3.1 | 1.2 | 1.1 |
| CYCLE3 | 4.4 | 4.3 | 4.2 | 4.1 | 1.4 | 1.3 |

U.S. PATENT DOCUMENTS

| | | | |
|---|---|---|---|
| 5,298,803 A | 3/1994 | Starkweather | 326/37 |
| 5,300,830 A | 4/1994 | Hawes | 326/41 |
| 5,361,238 A | 11/1994 | Owechko | 365/234 |
| 5,394,528 A | 2/1995 | Kobayashi et al. | 710/127 |
| 5,406,525 A | 4/1995 | Nicholes | 365/230.02 |
| 5,423,016 A | 6/1995 | Tsuchiya et al. | 711/123 |
| 5,432,804 A | 7/1995 | Diamondstein et al. | 714/795 |
| 5,469,555 A | 11/1995 | Ghosh et al. | 711/133 |
| 5,553,259 A | 9/1996 | Kalish et al. | 711/3 |
| 5,553,263 A | 9/1996 | Kalish et al. | 711/127 |
| 5,559,986 A | 9/1996 | Alpert et al. | 711/144 |
| 5,581,734 A | 12/1996 | DiBrino et al. | 711/169 |
| 5,586,303 A | 12/1996 | Willenz et al. | 711/172 |
| 5,590,352 A | 12/1996 | Zuraski et al. | 712/23 |
| 5,603,041 A | 2/1997 | Carpenter et al. | 710/129 |
| 5,627,963 A | 5/1997 | Gabillard et al. | 714/42 |

| INITIAL ADDRESS 00 | OB6 | OB5 | OB4 | OB3 | OB2 | OB1 |
|---|---|---|---|---|---|---|
| CYCLE1 | 1.4 | 1.3 | 1.2 | 1.1 | TAG.2 | TAG.1 |
| CYCLE2 | 2.4 | 2.3 | 2.2 | 2.1 | 4.2 | 4.1 |
| CYCLE3 | 3.4 | 3.3 | 3.2 | 3.1 | 4.4 | 4.3 |

FIG. 4A

| INITIAL ADDRESS 01 | OB6 | OB5 | OB4 | OB3 | OB2 | OB1 |
|---|---|---|---|---|---|---|
| CYCLE1 | 2.4 | 2.3 | 2.2 | 2.1 | TAG.2 | TAG.1 |
| CYCLE2 | 3.4 | 3.3 | 3.2 | 3.1 | 1.2 | 1.1 |
| CYCLE3 | 4.4 | 4.3 | 4.2 | 4.1 | 1.4 | 1.3 |

FIG. 4B

| INITIAL ADDRESS 10 | OB6 | OB5 | OB4 | OB3 | OB2 | OB1 |
|---|---|---|---|---|---|---|
| CYCLE1 | 3.4 | 3.3 | 3.2 | 3.1 | TAG.2 | TAG.1 |
| CYCLE2 | 4.4 | 4.3 | 4.2 | 4.1 | 2.2 | 2.1 |
| CYCLE3 | 1.4 | 1.3 | 1.2 | 1.1 | 2.4 | 2.3 |

FIG. 4C

| INITIAL ADDRESS 11 | OB6 | OB5 | OB4 | OB3 | OB2 | OB1 |
|---|---|---|---|---|---|---|
| CYCLE1 | 4.4 | 4.3 | 4.2 | 4.1 | TAG.2 | TAG.1 |
| CYCLE2 | 1.4 | 1.3 | 1.2 | 1.1 | 3.2 | 3.1 |
| CYCLE3 | 2.4 | 2.3 | 2.2 | 2.1 | 3.4 | 3.3 |

FIG. 4D

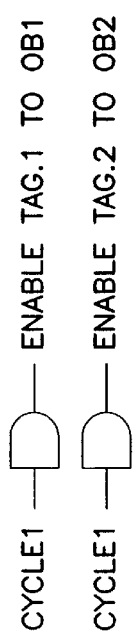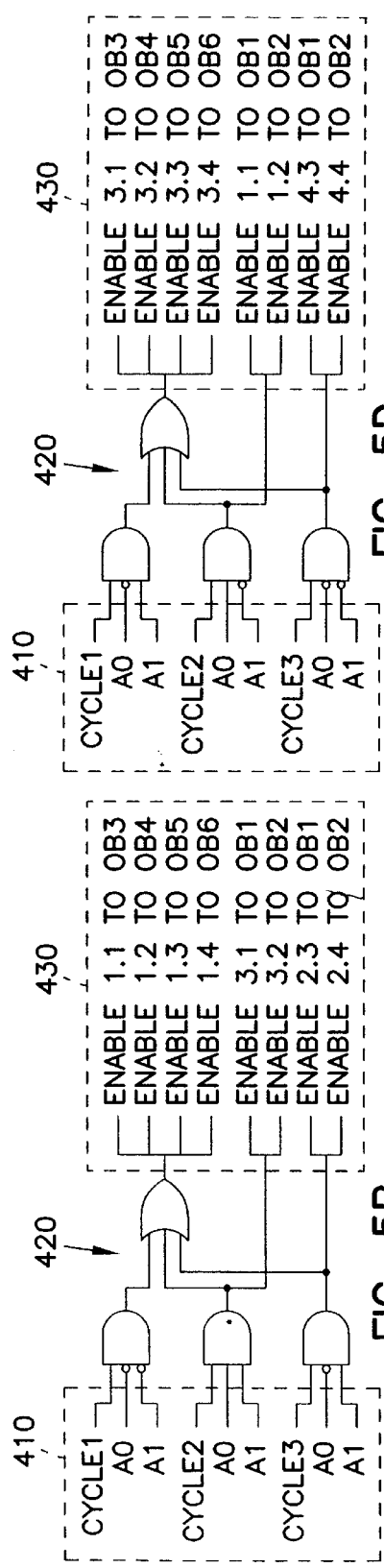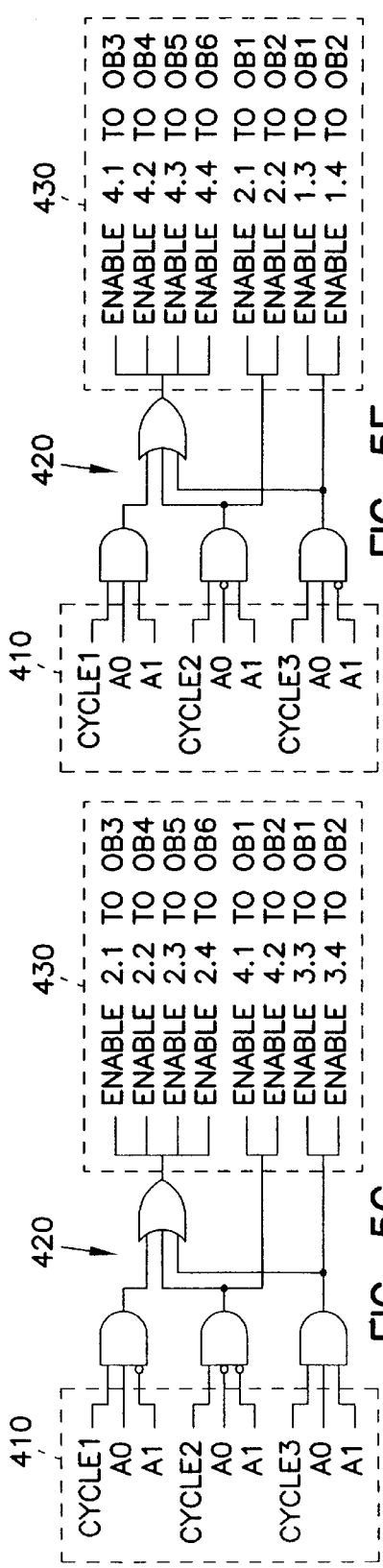

| INITIAL ADDRESS 00 | OB6 | OB5 | OB4 | OB3 | OB1 |
|---|---|---|---|---|---|
| CYCLE1 | 1.4 | 1.3 | 1.2 | 1.1 | TAG.1 |
| CYCLE2 | 2.4 | 2.3 | 2.2 | 2.1 | TAG.2 |
| CYCLE3 | 3.4 | 3.3 | 3.2 | 3.1 | TAG.3 |
| CYCLE4 | 4.4 | 4.3 | 4.2 | 4.1 | TAG.4 |

FIG. 7A

| INITIAL ADDRESS 01 | OB6 | OB5 | OB4 | OB3 | OB1 |
|---|---|---|---|---|---|
| CYCLE1 | 2.4 | 2.3 | 2.2 | 2.1 | TAG.1 |
| CYCLE2 | 3.4 | 3.3 | 3.2 | 3.1 | TAG.2 |
| CYCLE3 | 4.4 | 4.3 | 4.2 | 4.1 | TAG.3 |
| CYCLE4 | 1.4 | 1.3 | 1.2 | 1.1 | TAG.4 |

FIG. 7B

| INITIAL ADDRESS 10 | OB6 | OB5 | OB4 | OB3 | OB1 |
|---|---|---|---|---|---|
| CYCLE1 | 3.4 | 3.3 | 3.2 | 3.1 | TAG.1 |
| CYCLE2 | 4.4 | 4.3 | 4.2 | 4.1 | TAG.2 |
| CYCLE3 | 1.4 | 1.3 | 1.2 | 1.1 | TAG.3 |
| CYCLE4 | 2.4 | 2.3 | 2.2 | 2.1 | TAG.4 |

FIG. 7C

| INITIAL ADDRESS 11 | OB6 | OB5 | OB4 | OB3 | OB1 |
|---|---|---|---|---|---|
| CYCLE1 | 4.4 | 4.3 | 4.2 | 4.1 | TAG.1 |
| CYCLE2 | 1.4 | 1.3 | 1.2 | 1.1 | TAG.2 |
| CYCLE3 | 2.4 | 2.3 | 2.2 | 2.1 | TAG.3 |
| CYCLE4 | 3.4 | 3.3 | 3.2 | 3.1 | TAG.4 |

FIG. 7D

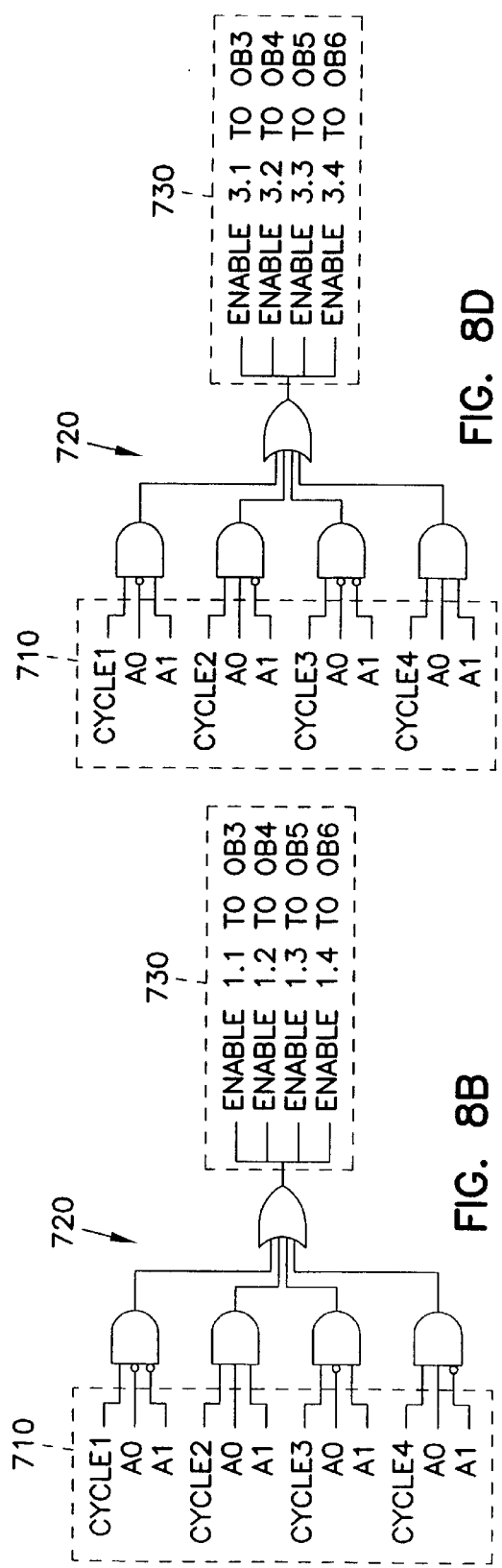
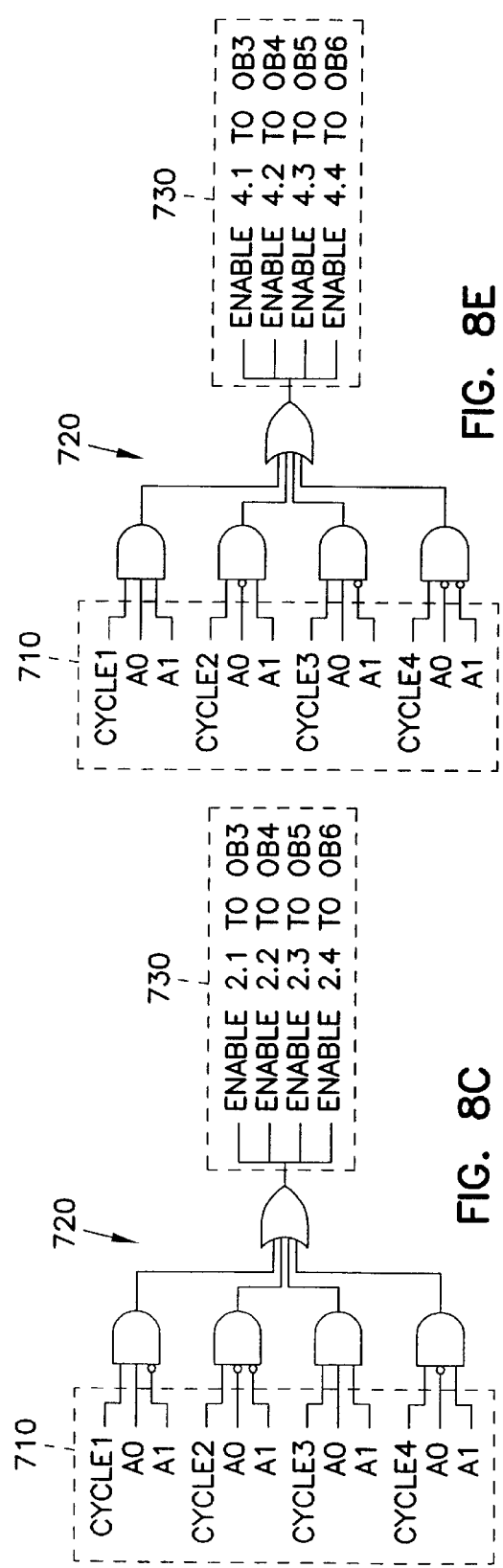
FIG. 8B
FIG. 8C
FIG. 8D
FIG. 8E

WORD SELECTION LOGIC TO IMPLEMENT AN 80 OR 96-BIT CACHE SRAM

This application is a Continuation of U.S. Ser. No. 09/299,799, filed Apr. 26, 1999, now U.S. Pat. No. 6,223,253, which is a Continuation of U.S. Serial No. 08/663,386, filed Jun. 13, 1996, now U.S. Pat. No. 5,960,453.

FIELD OF THE INVENTION

The present invention relates to digital computers in general, and to computer memory in particular. More particular still, this invention relates to logic implementation of cache memory.

BACKGROUND OF THE INVENTION

The performance of computer systems, especially personal computers, has improved dramatically due to the rapid growth in computer architecture design and in particular to the performance of computer memory.

Computer processors and memories however have not pursued the same pace of development through the years. Memories are not able to deliver enough response speed to processors. To reduce the gap in speed between the processors and memories, the concept of memory hierarchy was introduced. A memory hierarchy comprises a number of different memory levels, sizes and speeds. The memory located near or inside the processor is usually the smallest and fastest and is commonly referred to as cache memory. Cache memory needs to be fast to accommodate the demand of the processor therefore it is usually constructed from static-type memory or static random access memory (SRAM).

Cache memory plays an important role in the computer memory hierarchy. Computer instructions and data which are most likely to be reused are stored temporarily in the cache memory because the processor can access these instructions or data much faster than accessing them from the slower computer main memory.

Almost all of cache memories are managed by hardware meaning that the cache operation is physically controlled by logic circuits. Implementation of cache memory is not the same in different type of processors since the logic control circuits are different. In some implementations, a processor-cache interface uses a 64-bit bus data an additional bus for tag. The tag bus width varies, but has nominally been 16 bits for a total of 80 bits wide for tag plus data. If the cache block (or cache line) size is four times the data bus width, then no useful information appears on the tag bus for three out of every four bus cycles therefore the bus is not utilized efficiently.

There is a need for a logic to implement a cache SRAM so that the utilization of data and tag bus can be more efficient. This logic could implement a 64-bit data bus plus a 16-bit or more tag bus but the same logic is also usable to implement a 96-bit bus.

SUMMARY OF THE INVENTION

The present invention describes a selection logic which enables the implementation of an 80-bit wide or a 96-bit wide SRAM in a computer system comprising a microprocessor and a cache memory. In one embodiment, the logic enables the implementation of an 80-bit or a 96-bit wide cache SRAM. This logic could also be used to implement two SRAMs having half the width, that is two 40-bit or 48-bit cache SRAMs. The present invention permits higher useful data throughput on an 80 or a 96-bit bus than what has been previously achieved with an 80-bit bus. This logic implementation is accomplished by merging tag, error checking and correction (ECC), and data into an ordered block of information to maximize bus utilization.

The important advantages of this logic implementation is that it utilizes useful information on every bus cycle for an 80-bit bus case and it reduces the number of bus cycles from four to three in the case of a 96-bit bus.

BRIEF DESCRIPTION OF THE DRAWINGS

FIGS. 4A–4D are possible output block selection combinations when the initial address is 00, 01 ,10, and 11 respectively for the case of a 96-bit implementation.

FIGS. 5A–5E are the combinations of the logic for the case of a 96-bit implementation according to the present invention.

FIGS. 7A–7D are possible output block selection combinations for the case of an 80-bit implementation.

FIGS. 8A–8D are the combinations of the logic for the case of an 80-bit implementation according to the present invention.

DESCRIPTION OF THE PREFERRED EMBODIMENT

In the following detailed description of the preferred embodiment, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present inventions. The following detailed description is, therefore, not to be taken in limiting sense, and the scope of the invention is defined by the appended claims.

Figure 1:
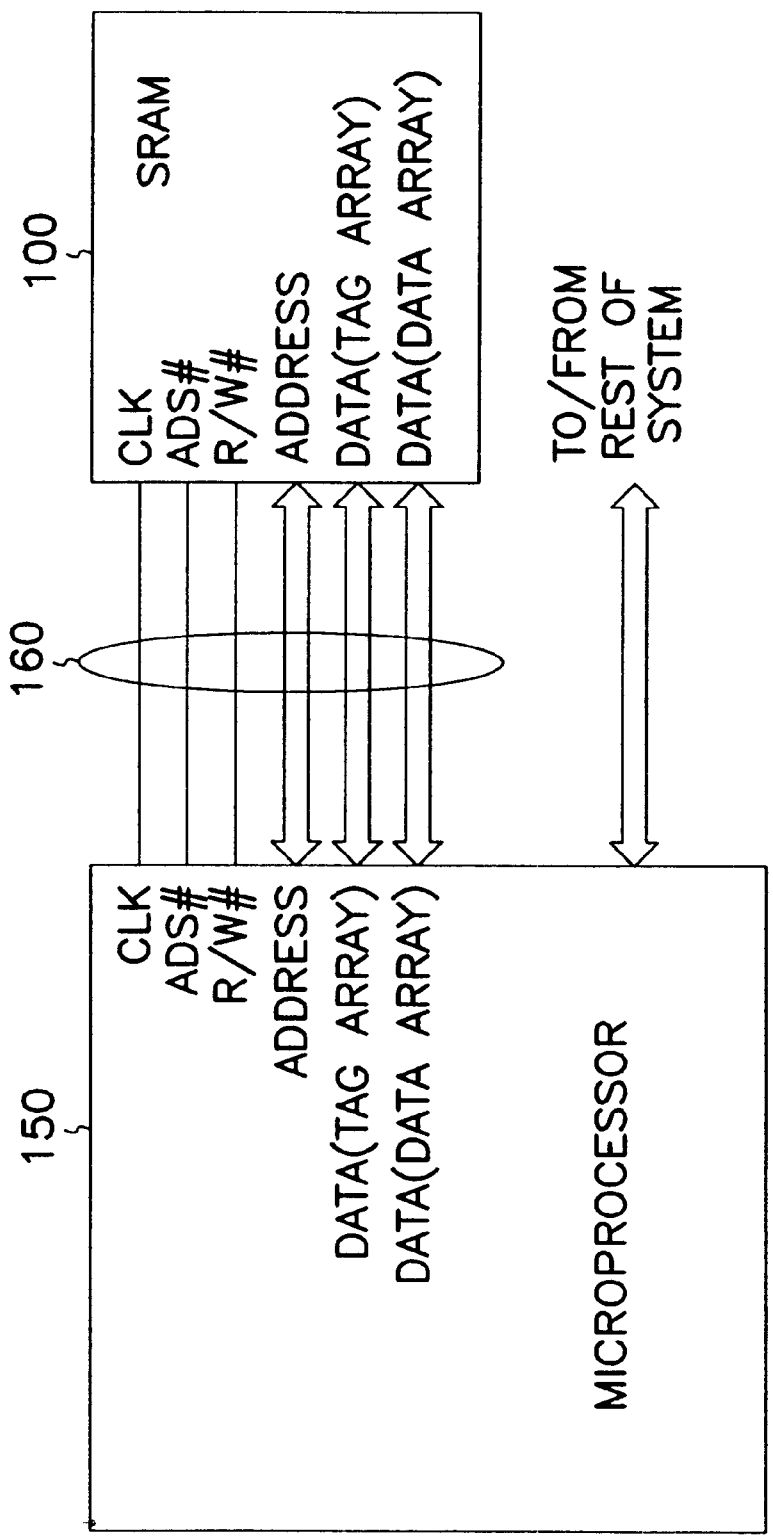
FIG. 1 is a block diagram of a simplified computer system comprising a microprocessor and an 80-bit or a 96-bit cache SRAM.

FIG. 1 illustrates a simplified computer system comprising a microprocessor 150 connected to an 80-/96-bit cache SRAM 100 through a processor-cache interface 160. Processor-cache interface 160 comprises a system clock (CLK), an address data strobe (ADS#), a read or write request (RW#), an address bus, a tag bus and an data bus.

Figure 2:
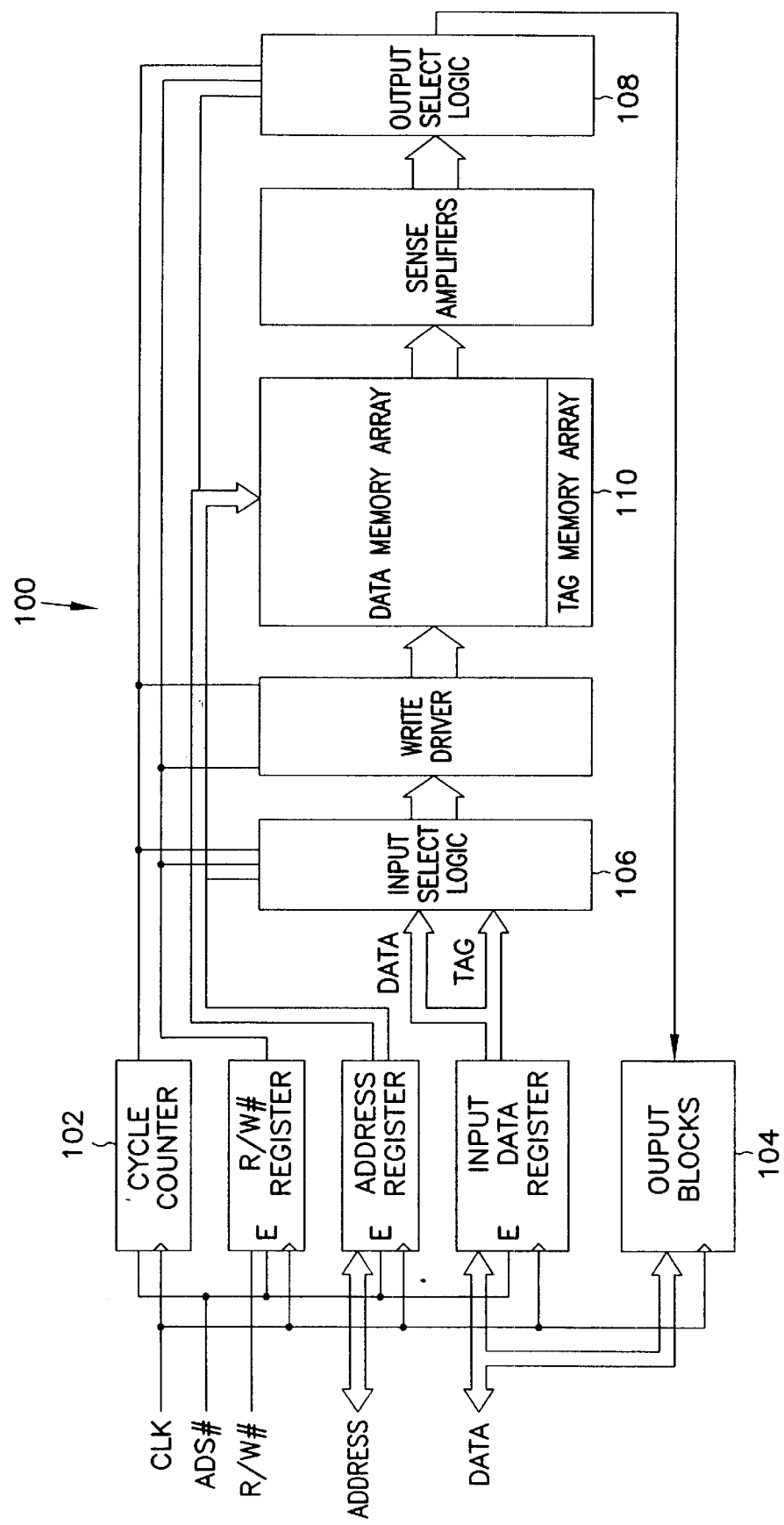
FIG. 2 is a block diagram of the 80-/96-bit cache SRAM of FIG. 1.

FIG. 2 is block diagram of the 80-/96-bit cache SRAM 100 of FIG. 1. Cache SRAM 100 can support an 80 to 96 bit data bus. The 80-bit or 96-bit operations are accomplished by a data ordering scheme and logic selections of input select logic 106 and output select logic 108. Input and output logic 106 and 108 are logically identical. Data are transferred to and from a data and tag memory array 110 in three bus cycles in the case of an 96-bit and in four bus cycles in the case of a 80-bit system. The sequence of the bus cycles is monitored by a bus cycle counter 102. Cycle counter 102 begins when ADS# is low and resets to zero and holds after three counts (cycle 1, cycle2 then cycle3 for a 96-bit system), or after four counts (cycle 1, cycle2, cycle3 then cycle4 for an 80-bit system). Data is written to or is read from memory array 110 by a write operation or read operation respectively. In the diagram, RW# indicates whether a read or write operation is requested, the sign # indicating that it writes if the signal is low. Address represents the sough memory location in memory array 110. Data represents a composite collection of data and tag bits.

Figure 3:
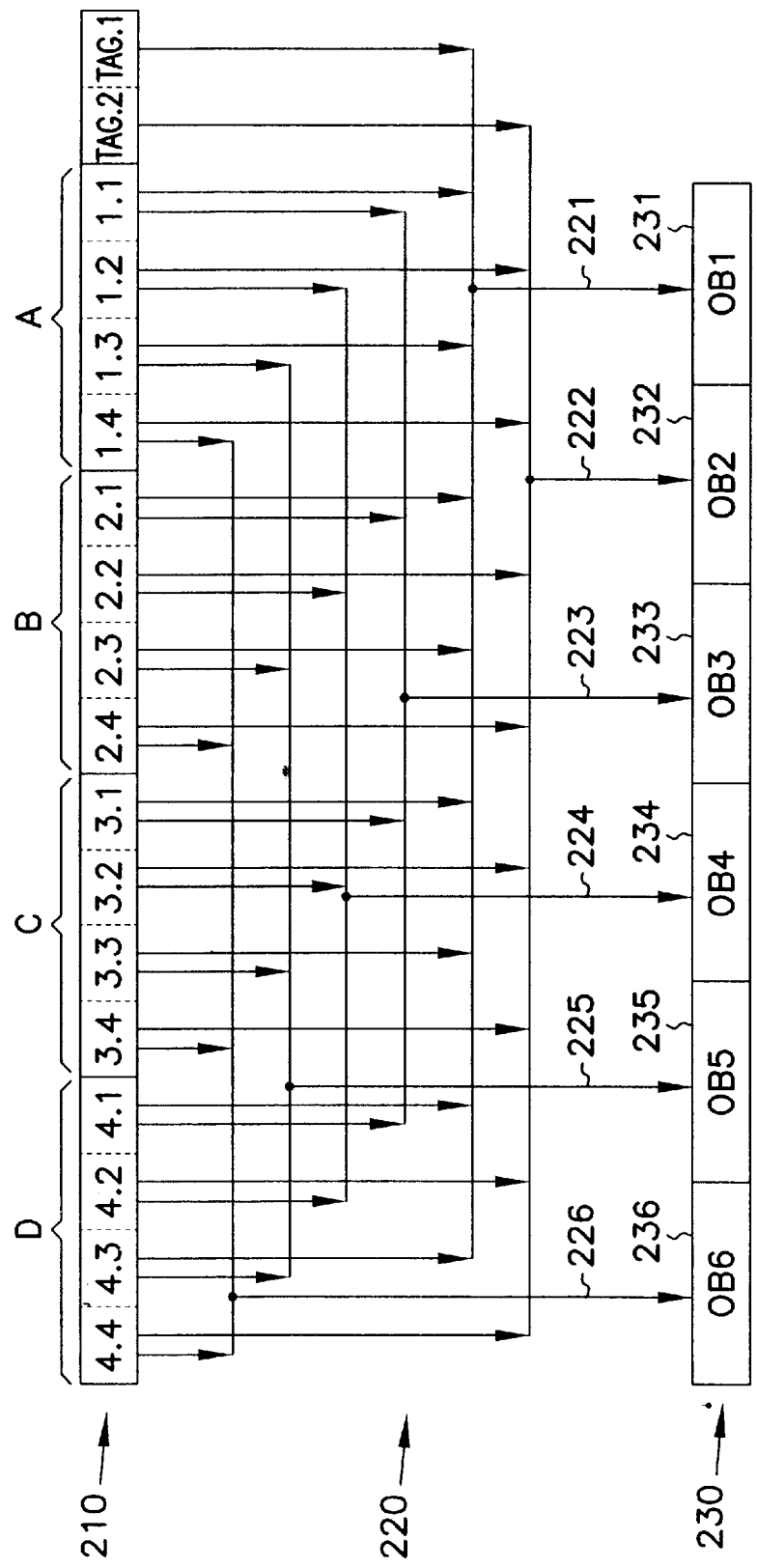
FIG. 3 is a block diagram of available routes for data transfer from the memory array to the output blocks for the case of a 96-bit implementation.

FIG. 3 is a block diagram of available routes for data to be transferred from the memory array to the output blocks for the case of a 96-bit implementation. This embodiment shows a portion of memory array 210 which comprises four 64-bit longwords A, B, C and D and two tag words totaling up to 32 bits and are indicated as tag.1 and tag.2. Tag in this and in other embodiments represents additional information such as status, ECC, tag, etc. Each of the four 64-bit longwords is divided into four 16-bit words. Longword A has four 16-bit words indicated as 1.1, 1.2, 1.3 and 1.4. Longword B has four 16-bit words indicated as 2.1, 2.2, 2.3 and 2.4. Longword C has four 16-bit words indicated as 3.1, 3.2, 3.3 and 3.4 and longword D has four 16-bit words indicated as 4.1, 4.2, 4.3 and 4.4. In this embodiments, 1.1 represents datum 1; word 1, 1.2 represents datum 1 word 2, 1.3 represents datum 1; word 3, and etc.

Words A, B, C and D, in that order, represent the order of data criticality to the processor. The actual physical address which is considered critically ordered differs from processor to processor in existing implementations and may entail a modula-4 linear burst, a modula-4 interleaved order, etc. For the typical line addressing microprocessor (e.g. PowerPC or Cyrix M1), the optimal order is modula-4 linear burst. This ordering is shown in Table A. Any other ordering for this type of processor will prevent maximization of performance for a processor designed to utilize the 96-bit operation. The reason for this is that, in the course of operating on a whole block of data, the highest probability of utilizing data in the block is 100% for the initial address, and less for each subsequent address. The probability is much lower for the previous address. Therefore, if the initial address is 01, the address before it, namely 00, is probably the least necessary to have and should therefore have less priority. Hence, A, D, C, and D would show the following sequence represented in binary form in which x stands for "any":

TABLE A

Linear Burst Data Ordering in a Four Entry Cache Line

| Initial address | A | B | C | D |
|---|---|---|---|---|
| x00 | x00 | x01 | x10 | x11 |
| x01 | x01 | x10 | x11 | x00 |
| x10 | x10 | x11 | x00 | x01 |
| x11 | x11 | x00 | x01 | x10 |

For processors which required interleaved burst order (e.g. Intel Pentium), a modula-4 interleaved burst order could be used. This ordering is shown in Table B.

Table B

Interleaved Burst Data Ordering in a Four Entry Cache Line

| Initial address | A | B | C | D |
|---|---|---|---|---|
| x00 | x00 | x01 | x10 | x11 |
| x01 | x01 | x00 | x11 | x10 |
| x10 | x10 | x11 | x00 | x01 |
| x11 | x11 | x10 | x01 | x00 |

In one embodiment, the order in which the cache line data words are transferred is programmable. Such a device would permit, for example, both interleaved and linear burst data ordering with the same cache device. In another embodiment, data ordering could be changed to reflect characteristics of the programs or programs being executed (e.g. a program operating at particular stride through memory).

Referring again to FIG. 3, data are transferred from memory array 210 to output blocks 230 by a logic selection from a plurality of pathways 220. Pathways 220 comprises thirty-four routes in which six routes 221 through 226 are connected to the output blocks 230 at each 16-bit output blocks 231 through 236 indicated respectively as OB1 to OB6. An output block is comprised of output buffers and optionally data registers or latches. The logic which enables six of these thirty-four available routes will be described below.

FIGS. 4A–4D are possible output block selection combinations when the initial address is 00, 01, 10, and 11 respectively for the case of a 96-bit implementation. These Figures clearly shows that a 96-bit bus can be implemented using only three bus cycles. Tag only appears in the first bus cycle (cycle1), freeing the input/output lines for data transfer during cycle two (cycle2) and cycle three (cycle3). This ordering simplies the logic needed to transfer the cache line data words and reduces the number of paths that must be available. The logic which enables these possible output block selection combinations is described in FIGS. 5A–5E.

FIGS. 5A–5E are the combinations of the logic for the case of a 96-bit implementation. For this 96-bit case, only three bus cycles are needed and the order of data transaction is cycle 1, then cycle2, and finally cycle3. In this embodiment, the logic comprises a combination of input 410, logic gates 420 and a plurality of outputs 430. Logic gates 420 comprises a plurality of logic AND and logic OR gates. Input 410 driving the logic comprises cycle 1, cycle2, cycle3, A0 and A1. A0 and A1 represent the two least significant bits of the initial address. Cycle1, cycle2 or cycle3 is the current bus cycle determined by bus cycle counter 102. Outputs 430 from this logic enables the data to be transferred to the appropriate blocks OB1 through OB6 of output blocks 230. Detailed combinations of the logic enabling at output 430 are described in Table 1. In this table, OB represents output block, IA represents the least two significant bits of the initial address, tag.1 and tag.2 represent the miscellaneous additional information such as status, ECC, tag, etc. and 1.1 represents datum 1: word 1 in the current cache line, 1.2 represents datum 1; word 2, etc.

Table 1

Logic for a 96-bit Linear Burst Data Ordering Implementation

Enable tag.1 to OB1 = Cycle1
Enable tag.2 to OB2 = Cycle1
Enable 1.1 to OB3 = Cycle1 AND (IA=00) OR Cycle2 AND (IA=11) OR Cycle3 AND (IA=10)

Table 1-continued

Logic for a 96-bit Linear Burst Data Ordering Implementation

Enable 1.2 to OB4 = Cycle1 AND (IA=00) OR Cycle2 AND (IA=11) OR Cycle3 AND (IA=10)
Enable 1.3 to OB5 = Cycle1 AND (IA=00) OR Cycle2 AND (IA=11) OR Cycle3 AND (IA=10)
Enable 1.4 to OB6 = Cycle1 AND (IA=00) OR Cycle2 AND (IA=11) OR Cycle3 AND (IA=10)
Enable 1.1 to OB1 = Cycle2 AND (IA=01)
Enable 1.2 to OB2 = Cycle2 AND (IA=01)
Enable 1.3 to OB1 = Cycle3 AND (IA=01)
Enable 1.4 to OB2 = Cycle3 AND (IA=01)
Enable 2.1 to OB3 = Cycle1 AND (IA=01) OR Cycle2 AND (IA=00) OR Cycle3 AND (IA=11)
Enable 2.2 to OB4 = Cycle1 AND (IA=01) OR Cycle2 AND (IA=00) OR Cycle3 AND (IA=11)
Enable 2.3 to OB5 = Cycle1 AND (IA=01) OR Cycle2 AND (IA=00) OR Cycle3 AND (IA=11)
Enable 2.4 to OB6 = Cycle1 AND (IA=01) OR Cycle2 AND (IA=00) OR Cycle3 AND (IA=11)
Enable 2.1 to OB1 = Cycle2 AND (IA=10)
Enable 2.2 to OB2 = Cycle2 AND (IA=10)
Enable 2.3 to OB1 = Cycle3 AND (IA=10)
Enable 2.4 to OB2 = Cycle3 AND (IA=10)
Enable 3.1 to OB3 = Cycle1 AND (IA=10) OR Cycle2 AND (IA=01) OR Cycle3 AND (IA=00)
Enable 3.2 to OB4 = Cycle1 AND (IA=10) OR Cycle2 AND (IA=01) OR Cycle3 AND (IA=00)
Enable 3.3 to OB5 = Cycle1 AND (IA=10) OR Cycle2 AND (IA=01) OR Cycle3 AND (IA=00)
Enable 3.4 to OB6 = Cycle1 AND (IA=10) OR Cycle2 AND (IA=01) OR Cycle3 AND (IA=00)
Enable 3.1 to OB1 = Cycle2 AND (IA=11)
Enable 3.2 to OB2 = Cycle2 AND (IA=11)
Enable 3.3 to OB1 = Cycle3 AND (IA=11)
Enable 3.4 to OB2 = Cycle3 AND (IA=11)
Enable 4.1 to OB3 = Cycle1 AND (IA=11) OR Cycle2 AND (IA=10) OR Cycle3 AND (IA=01)
Enable 4.2 to OB4 = Cycle1 AND (IA=11) OR Cycle2 AND (IA=10) OR Cycle3 AND (IA=01)
Enable 4.3 to OB5 = Cycle1 AND (IA=11) OR Cycle2 AND (IA=10) OR Cycle3 AND (IA=01)
Enable 4.4 to OB6 = Cycle1 AND (IA=11) OR Cycle2 AND (IA=10) OR Cycle3 AND (IA=01)
Enable 4.1 to OB1 = Cycle2 AND (IA=00)
Enable 4.2 to OB2 = Cycle2 AND (IA=00)
Enable 4.3 to OB1 = Cycle3 AND (IA=00)
Enable 4.4 to OB2 = Cycle3 AND (IA=00)

Those skilled in the art will readily recognize that the above description for a 96-bit bus implementation could also be used to implement a 96-bit wide device using two 48-bit wide devices. The 96-bit implementation for the two 48-bit wide devices would be implemented as such: all the even words are in one device, and all the odd words are in the other device. For example, words 1.4, 2.4, 3,4, 4.4, 1.2, 2.2, 3.2,4.2 (x.4, x.2), OB6, OB4, OB2 are in one device, and x.3, x.1, OB5, OB3, OB I are in the other device. The described logic operates exactly as explained and the devices operate together seamlessly, and only one design is necessary; two identical devices are used in the implementation.

Figure 6:
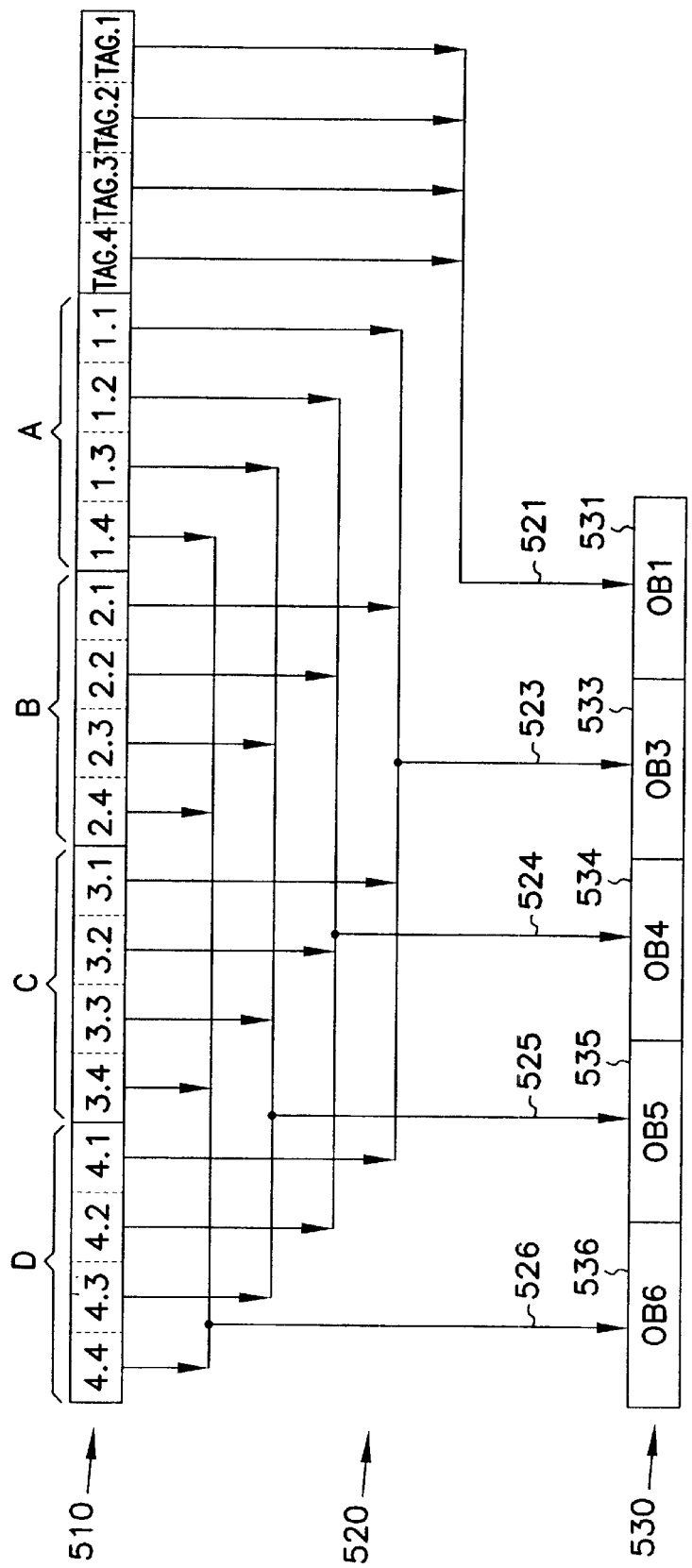
FIG. 6 is a block diagram of available routes for data transfer from the memory array to the output blocks for the case of an 80-bit implementation.
Figure 8A:
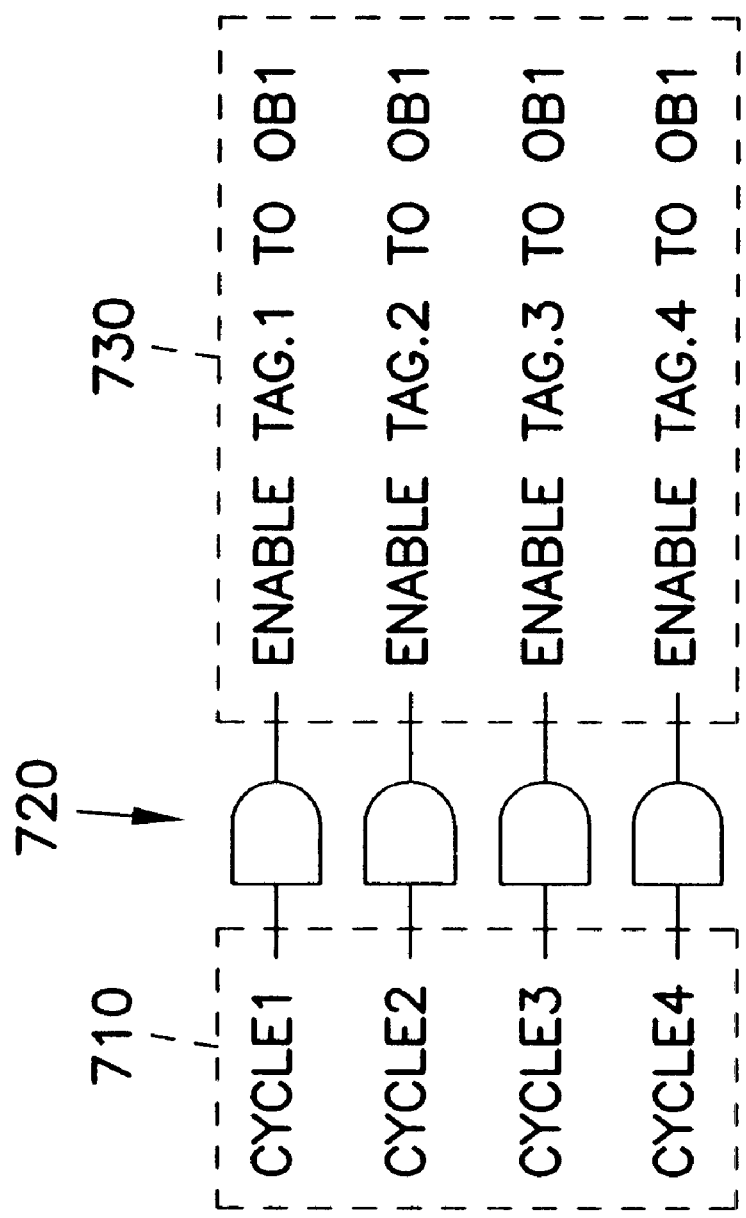

FIG. 6 is a block diagram of available routes for data to be transferred from the memory array to the output blocks for the case of an 80-bit implementation. In this embodiment, longwords A, B, C and D are arranged in the same structure in the portion of memory array 510 as in FIG. 3 for the case of 96-bit implementation however, up to four tag words indicated as tag.1, tag.2, tag.3 and tag.4 can be utilized. The output blocks 530 in this embodiment comprises five 16-bit output block 531, 533, 534, 535 and 536 which are indicated respectively as OB1, OB3, OB4, OB5 and OB6. Data are transferred from the memory array 510 to output blocks 530 by a logic selection from a plurality of pathways 520. Pathways 520 comprises up to twenty routes in which five routes 521, 523, 524, 525 and 526 are connected to output blocks 530.

FIGS. 7A–7D are possible output block selection combinations when the initial address is 00, 01, 10, and 11 respectively for the case of an 80-bit implementation. These Figures shows that four bus cycles are needed for data transfer. In this case, tag or useful information appears on every bus cycles (cycle1 through cycle4) therefore it is an efficient utilization of bus. In this 80-bit implementation, to maximize performance, the tag limit is 16 bits. If more tag bits are need, the 80-bits would be expanded within reason to accommodate the additional necessary bits. For example, if a 20-bit tag is essential, this would entail an 84-bit bus. 11 bits of ECC is sufficient regardless of tag size, within reason. The logic which enables these possible output block selection combinations is described in FIGS. 8A–8E.

FIGS. 8A–8E are the combinations of the logic for the case of an 80-bit implementation. For this 80-bit case, four bus cycles are needed and the order of data transaction is cycle1, then cycle2, then cycle3, and finally cycle4. In this embodiment, the logic comprises a combination of input 710, logic gates 720 and a plurality of outputs 730. Logic gates 720 comprises logic a plurality of logic AND and logic OR gates. Input 710 driving the logic comprises cycle1, cycle2, cycle3, cycle4, A0 and A1. A0 and A1 represent the two least significant bits of the initial address. Cycle 1, cycle2 or cycle3 is the current bus cycle determined by bus cycle counter 102. Outputs 730 from this logic enables the data to be transferred to the appropriate blocks of output blocks 530. Detailed combinations of the logic enabling at output 730 are described in Table 2. In this table, OB represents output block, IA represents the least two significant bits of the initial address, tag.1 and tag.2 represent the miscellaneous additional information such as status, ECC, tag, etc. and 1.1 represents datum 1: word 1 in the current cache line, 1.2 represents datum 1; word 2, etc.

TABLE 2

Logic for an 80-bit Linear Burst Data Ordering Implementation

Enable tag.1 to OB1 = Cycle1
Enable tag.2 to OB1 = Cycle2
Enable tag.3 to OB1 = Cycle3
Enable tag.4 to OB1 = Cycle4
Enable 1.1 to OB3 = Cycle1 AND (IA=00) OR Cycle2 AND (IA=11) OR Cycle3 AND (IA=10) OR Cycle4 AND (IA=01)
Enable 1.2 to OB4 = Cycle1 AND (IA=00) OR Cycle2 AND (IA=11) OR Cycle3 AND (IA=10) OR Cycle4 AND (IA=01)
Enable 1.3 to OB5 = Cycle1 AND (IA=00) OR Cycle2 AND (IA=11) OR Cycle3 AND (IA=10) OR Cycle4 AND (IA=01)
Enable 1.4 to OB6 = Cycle1 AND (IA=00) OR Cycle2 AND (IA=11) OR Cycle3 AND (IA=10) OR Cycle4 AND (IA=01)
Enable 2.1 to OB3 = Cycle1 AND (IA=01) OR Cycle2 AND (IA=00) OR Cycle3 AND (IA=11) OR Cycle4 AND (IA=10)
Enable 2.2 to OB4 = Cycle1 AND (IA=01) OR Cycle2 AND (IA=00) OR Cycle3 AND (IA=11) OR Cycle4 AND (IA=10)
Enable 2.3 to OB5 = Cycle1 AND (IA=01) OR Cycle2 AND (IA=00) OR Cycle3 AND (IA=11) OR Cycle4 AND (IA=10)
Enable 2.4 to OB6 = Cycle1 AND (IA=01) OR Cycle2 AND (IA=00) OR Cycle3 AND (IA=11) OR Cycle4 AND (IA=10)
Enable 3.1 to OB3 = Cycle1 AND (IA=10) OR Cycle2 AND (IA=01) OR Cycle3 AND (IA=00) OR Cycle4 AND (IA=11)
Enable 3.2 to OB4 = Cycle1 AND (IA=10) OR Cycle2 AND (IA=01) OR Cycle3 AND (IA=00) OR Cycle4 AND (IA=11)
Enable 3.3 to OB5 = Cycle1 AND (IA=10) OR Cycle2 AND (IA=01) OR Cycle3 AND (IA=00) OR Cycle4 AND (IA=11)
Enable 3.4 to OB6 = Cycle1 AND (IA=10) OR Cycle2 AND (IA=01) OR Cycle3 AND (IA=00) OR Cycle4 AND (IA=11)

TABLE 2-continued

Logic for an 80-bit Linear Burst Data Ordering Implementation

Enable 4.1 to OB3 = Cycle1 AND (IA=11) OR Cycle2 AND (IA=10) OR Cycle3 AND (IA=01) OR Cycle4 AND (IA=00)
Enable 4.2 to OB4 = Cycle1 AND (IA=11) OR Cycle2 AND (IA=10) OR Cycle3 AND (IA=01) OR Cycle4 AND (IA=00)
Enable 4.3 to OB5 = Cycle1 AND (IA=11) OR Cycle2 AND (IA=10) OR Cycle3 AND (IA=01) OR Cycle4 AND (IA=00)
Enable 4.4 to OB6 = Cycle1 AND (IA=11) OR Cycle2 AND (IA=10) OR Cycle3 AND (IA=01) OR Cycle4 AND (IA=00)

Those skilled in the art will readily recognize that the implementation for a 80-bit wide device described above could also be used to implement an 80-bit bus wide in a memory device using more than one device. For example, if the 80-bit bus is split across two devices, OB1 would have to be split into two 8-bit halves so that two such identical devices would comprise the 80-bit bus device. As such only one device type is needed, and that device is used twice. The same principle applied in a four device implementation. In this case, the tag and OB1 is split evenly among four devices.

From the illustrations and descriptions of FIG. 3 through FIG. 8E, it is apparent that there are commonality in the available pathways and in the logic selections between the 80-bit and 96-bit implementations. Further examining of FIG. 3 (available routes for a 96-bit implementation) and FIG. 6 (available routes for an 80-bit implementation), a conclusion can be drawn that FIG. 6 is a subset of FIG. 3. Further examining of FIGS. 5A–5E (logic for a 96-bit implementation) and FIGS. 8A–8E (logic for an 80-bit implementation) and also Table 1 and Table 2, a modification could be made to the logic so that it can implement both 80-bit and 96-bit implementation from the same memory array. Thus the block diagram of the routes in FIG. 3 can be used for both cases of an 80-bit and 96-bit implementation, and the modified logic to implement both cases is illustrated in FIGS. 9A–9E.

FIGS. 9A–9E are the combinations of the logic for both cases of an 80-bit and a 96-bit implementation according to the present invention. This embodiment shows the logical differences between the 80-bit and the 96-bit implementation and identifies the logic that is common and specific to each implementation. In FIGS. 9A–9E, the common logic in each Figure is the entire logic excluding optional logic indicated at 96 and optional logic indicated at 80. The common logic and optional logic 96 are active only in the case of a 96-bit implementation. The common logic and optional logic 80 are active only in the case of an 80-bit implementation.

From the detailed description of the invention, an 80-bit implementation is carried out by four bus cycles and useful information is on every cycle therefore the bus utilization is more efficient. A 96-bit implementation requires only three instead of four cycles thus speeding up the data transaction process. The block selections described in these embodiments are in terms of output but it is also understood that the input ordering is identical and follows the same logic. Furthermore it is clear that implementation of an 80-bit and a 96-bit device using the same memory array can be obtained by the logic described in the present invention.

What is claimed is:

1. A control logic for selectively enabling transfer of data between a plurality of data outputs and a bus, the control logic comprising:

routing paths connected to the data outputs;

a logic circuit connected to the data outputs, wherein the logic circuit includes:

a plurality of common logic; and first and second optional logic, the first optional logic and the common logic providing a first set of enable bits, the second optional logic and the common logic providing a second set of enable bits, and wherein the first and second sets of enable bits are selected as a function of bus width.

2. The control logic of claim 1, wherein the logic circuit further including a plurality of inputs, the plurality of inputs including a bus width indicator and a plurality of address bits.

3. The control logic of claim 2, wherein the plurality of address bits includes initial address bits.

4. The control logic of claim 1, wherein the logic circuit connects to a counter, the counter including a number of counter cycles, wherein the first optional logic is operative when the number of counter cycles equals four.

5. The control logic of claim 1, wherein the logic circuit connects to a counter, the counter including a number of counter cycles, wherein the second optional logic is operative when the number of counter cycles equals three.

6. A control system in a computer, the control system comprising:

an N-bit wide bus; and control logic for controlling data transferring on the bus, the control logic including a plurality of common logic and first and second optional logic, the first optional logic and the common logic providing a first set of enable bits, the second optional logic and the common logic providing a second set of enable bits, and wherein the first and second sets of enable bits are selected as a function of bus width.

7. The control system of claim 6, wherein the first set of enable bits is activated when N is 80.

8. The control system of claim 6, wherein the second set of enable bits is activated when N is 96.

9. A cache memory comprising:

a cache interface including an N-bit wide bus;

a memory including a plurality of longwords;

a plurality of routing paths connected to the memory, the routing paths including subsets of routing paths, each of the subsets including a different number of paths; and a plurality of selector bits for selectively selecting the subsets for data transfer between the longwords and the N-bit wide bus, wherein the selector bits are set as a function of bus width.

10. The cache memory of claim 9, wherein N is 80.

11. The cache memory claim 9, wherein N is 96.

12. The cache memory of claim 9, wherein N is between 80 and 96.

13. The cache memory of claim 9, wherein the selector bits includes first and second groups of enable bits.

14. The cache memory of claim 13, wherein the first group of enable bits enables one portion of the routing paths based on one function of bus width, and the second group of enable bits enables another portion of the routing paths based on another function of bus width.

15. A computer system comprising:

a processor;

an N-bit wide bus connected to the processor; and a cache memory connected to the bus, the cache memory including a control logic for controlling data transferring on the bus, the control logic including a plurality of common logic and first and second optional logic, the first optional logic and the common logic providing a first set of enable bits, the second optional logic and the common logic providing a second set of enable bits, and wherein the first and second sets of enable bits are selected as a function of bus width.

16. The computer system of claim 15, wherein the first set of enable bits is activated when N is 80.

17. The computer system of claim 15, wherein the second set of enable bits is activated when N is 96.

18. A computer system comprising:
a processor;
an N-bit wide bus connected to the processor; and
a cache memory connected to the bus, the cache memory including:
  a plurality of longwords;
  a plurality of routing paths connected to the longwords, the routing paths including subsets of routing paths, each of the subsets including a different number of paths; and
  a plurality of selector bits for selectively selecting the subsets for data transfer between the longwords and the bus, wherein the selector bits are set as a function of bus width.

19. The computer system of claim 18, wherein N is 80.

20. The computer system of claim 18, wherein N is 96.

21. The computer system of claim 18, wherein N is between 80 and 96.

22. The computer system of claim 18, wherein the selector bits includes first and second group of enable bits.

23. The computer system of claim 22, wherein the first group of enable bits enables one portion of the routing paths based on one function of bus width, and the second group of enable bits enables another portion of the routing paths based on another function of bus width.

24. A computer system comprising:
a processor;
a bus connected to the processor; and
a cache memory connected to the bus, the cache memory including:
  a control logic including selectable outputs; and
  a plurality of pathways connected between the selectable outputs and the bus, the pathways including a plurality of subsets of paths, wherein the selectable outputs are selected as a function of bus width to implement data transfer on the subset of paths, wherein each of the subset of paths includes a different number of pathways.

25. The computer system of claim 24, wherein the cache memory further comprises a plurality of cache lines, each of the cache lines including a plurality of longwords and a plurality of tag words, each of the longwords including a plurality of words, which together with the tag words are merged into an ordered block of information controlled by the control logic to allow the optimal use of the bus.

26. A computer system comprising:
a processor;
an N-bit wide bus connected to the processor; and
a memory device connected to the bus, the memory device including:
  a memory array including a plurality of tag words, first, second, third and fourth longwords, each of the longwords including a plurality of words;
  a plurality of output blocks connected between the bus and the memory array;
  a plurality of data routing pathways connected between the output blocks and the memory array for data transfer between the memory array and the output blocks;
  an input select logic including a plurality of common logic, and a plurality of optional logic including first and second optional logic, and a plurality of inputs and outputs;
  an output select logic including a plurality of common logic, and a plurality of optional logic including first and second optional logic, and a plurality of inputs and outputs; and
  a bus cycle counter producing a plurality of sequential count cycles to keep track of the count cycles of the N-bit wide data bus.

27. The computer system of claim 26, wherein the input and output select logic are logically the same.

28. The computer system of claim 26, wherein in a memory operation, the common logic are always operative, the first optional logic is operative when N is 80, and the second optional logic is operative when N is 96.

29. The computer system of claim 26, wherein the inputs and the outputs of the input and output select logic include sequential count cycles of the cycle counter and two least significant digits of an initial address of the longwords.

30. The computer system of claim 26, wherein the cycle counter resets to zero after counting the first, the second and the third count cycle when the bus is a 96-bit wide bus, and the cycle counter resets to zero after counting the first, the second, the third and the fourth count cycle when the N-bit bus is a 80-bit wide bus.

31. The computer system of claim 26, wherein all the tag words associated with the first, second, third and forth longwords are transferred on the first bus cycle when the bus is a 96-bit wide data bus, and the tag words associated with the first, second, third and fourth longwords are transferred in every bus cycle when the bus is an 80-bit wide data bus.

32. The computer system of claim 26, wherein the data routing pathways include thirty-four pathways.

33. The computer system of claim 32, wherein the input and output select logic enable up to six of the thirty-four data routing pathways to transfer data from the memory array to the associated output blocks.

34. The computer system of claim 26, wherein the input select logic and the output select logic are configured the same.

35. A method of transferring data between a cache memory and a bus, the method comprising:
receiving an address;
determining a transfer order from selected bits of the address;
combining a first logic and a second logic to produce selector bits if the bus width is 80 bits wide;
combining a third logic and the second logic to produce selector bits if the bus width is 96 bits wide, wherein the selector bits are not the same between the 80-bit wide and 96-bit wide bus;
selecting a plurality of routing paths based on the selector bits; and
transferring data between the cache memory and the bus via the selected routing paths based on the transfer order.

36. The method of claim 35, wherein determining transfer order includes examining initial address bits.

37. The method of claim 35, wherein selecting a plurality of routing paths include selecting a first group of routing paths if the bus is 80-bit wide, and selecting a second group of routing path if the bus is 96-bit wide, wherein first and second group of routing paths include different number of paths.

38. A method of transferring data between a cache memory and a bus, the method comprising:

receiving an address;

determining a transfer order from selected bits of the address;

logically combining the selected bits of the address with outputs of a cycle counter to produce selector bits as a function of bus width;

selecting a plurality of routing paths based on the selector bits; and transferring data between the cache memory and the bus via the selected routing paths.

39. The method of claim 38, wherein determining transfer order includes examining initial address bits.

40. The method of claim 39, wherein selecting a plurality of routing paths includes selecting a first group of routing paths if the bus is 80-bit wide, and selecting a second group of routing path if the bus is 96-bit wide, wherein first and second groups of routing paths include different number of paths.

41. A method of transferring data between a cache memory and a processor, the cache memory and the processor being connected by a bus, the method comprising:

receiving an address;

determining a transfer order from selected bits of the address;

logically combining the selected bits of the address with outputs of a cycle counter to produce selector bits as a function of bus width;

selecting a plurality of routing paths based on the selector bits; and transferring data between the cache memory and the bus via the selected routing paths.

42. The method of claim 41, wherein determining transfer order includes examining initial address bits.

43. The method of claim 41, wherein selecting a plurality of routing paths includes selecting a first group of routing paths if the bus is 80-bit wide, and selecting a second group of routing path if the bus is 96-bit wide, wherein first and second group of routing paths include different number of paths.

* * * * *

UNITED STATES PATENT AND TRADEMARK OFFICE
CERTIFICATE OF CORRECTION

Figure 9A:
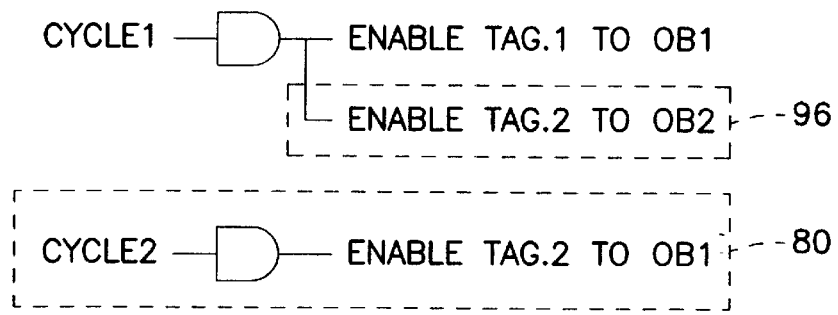
FIGS. 9A–9E are the combinations of the logic for both cases of an 80-bit and a 96-bit implementation according to the present invention.
Figure 9B:
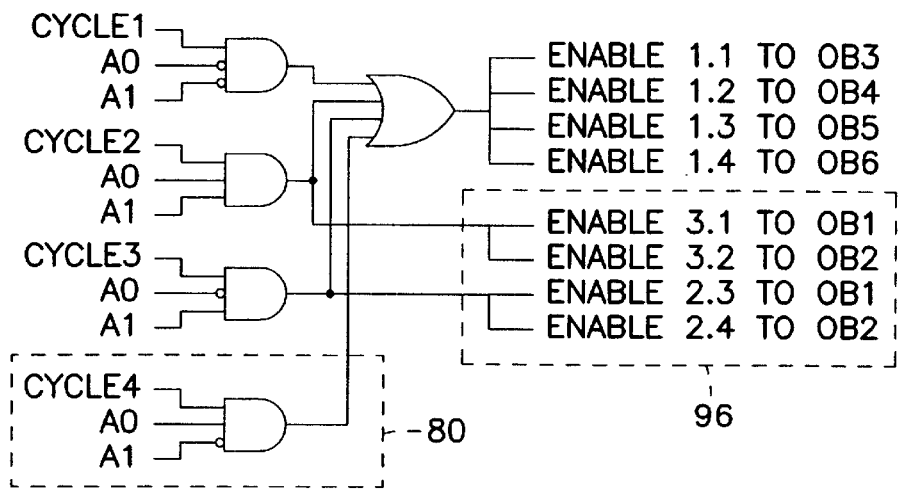
Figure 9C:
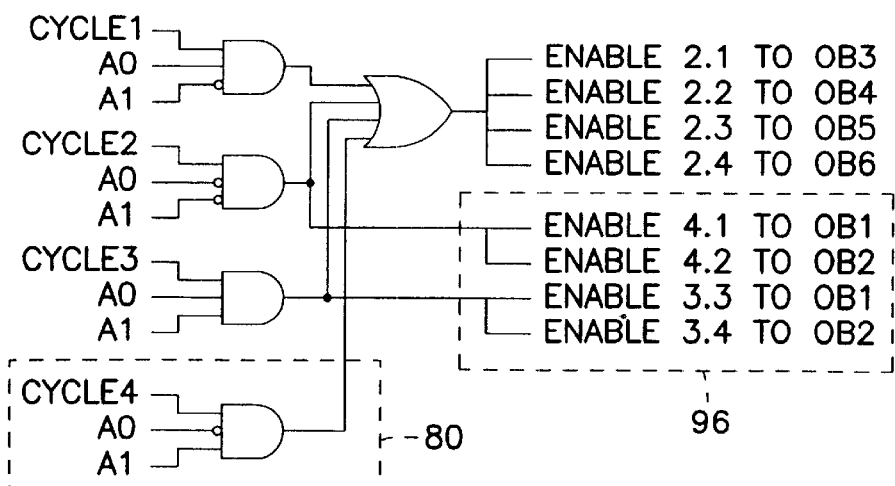
Figures 9D, 9E:
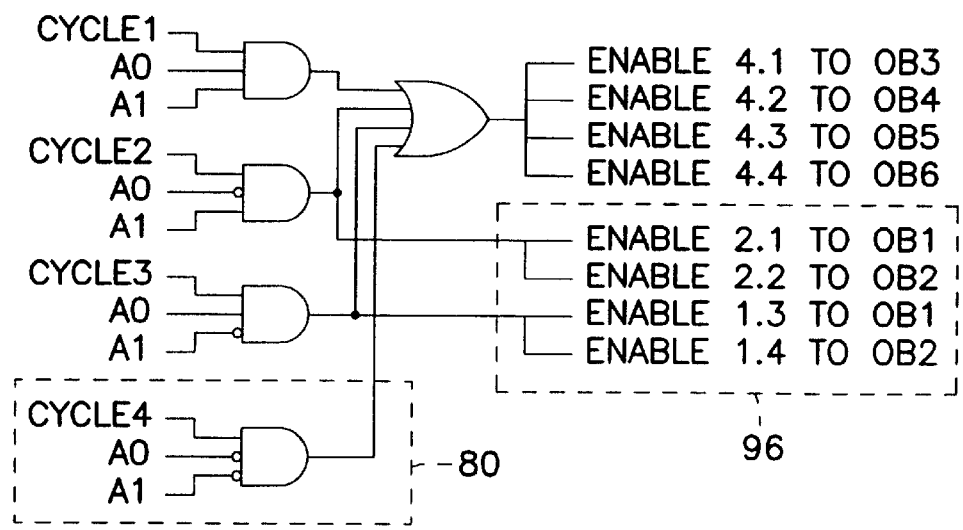
Figure 9D:
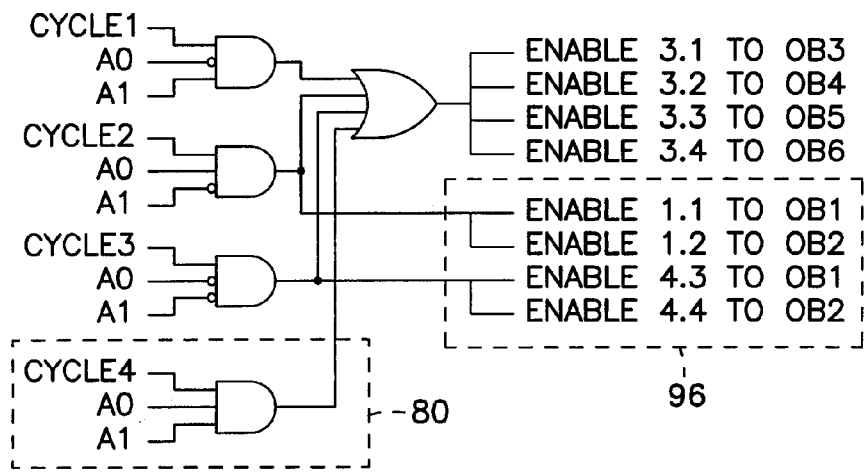
Figure 9E:
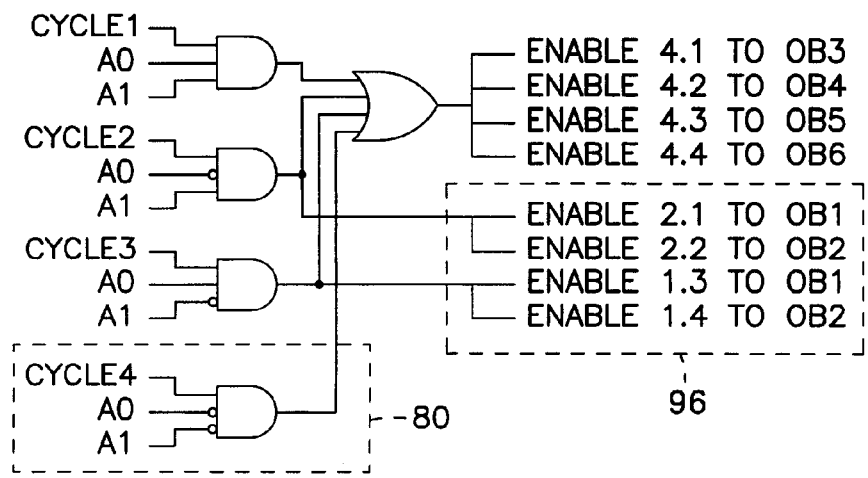

PATENT NO. : 6,493,799 B2
DATED : December 10, 2002
INVENTOR(S) : Joseph T. Pawlowski It is certified that error appears in the above-identified patent and that said Letters Patent is hereby corrected as shown below:

<u>Drawings,</u>
Sheet 11 of 11, FIG. 9D, please substitute the attached FIG. 9D.

<u>Column 3,</u>
Line 51, delete "D." and insert -- B. -- therefor.

<u>Column 11,</u>
Line 20, delete "claim 39" and insert -- claim 38 -- therefor.

Signed and Sealed this

Twenty-ninth Day of July, 2003

JAMES E. ROGAN
*Director of the United States Patent and Trademark Office*